United States Patent [19]

Fujioka et al.

[11] 4,450,944
[45] May 29, 1984

[54] WET TYPE MULTIPLE DISC CLUTCH

[75] Inventors: Kazuyoshi Fujioka, Tokyo; Shinsuke Eguchi, Yokohama, both of Japan

[73] Assignee: Nissan Motor Co., Ltd., Yokohama, Japan

[21] Appl. No.: 329,810

[22] Filed: Dec. 11, 1981

[30] Foreign Application Priority Data

Dec. 19, 1980 [JP] Japan .......................... 55-181788[U]

[51] Int. Cl.$^3$ ...................... F16D 13/72; F16D 13/74; F16D 25/063
[52] U.S. Cl. ............... 192/70.12; 192/85 AA; 192/113 B
[58] Field of Search .......... 192/70.12, 85 AA, 113 B; 411/353, 517, 518, 519, 521, 530

[56] References Cited

U.S. PATENT DOCUMENTS

| | | | |
|---|---|---|---|
| 2,091,271 | 8/1937 | Colman | 192/70.12 X |
| 2,654,404 | 10/1953 | Neuhauser | 411/517 X |
| 2,837,192 | 6/1958 | Dunkelow | 192/85 AA |
| 3,048,250 | 8/1962 | Kershner | 192/113 B X |
| 3,202,253 | 8/1965 | Merritt et al. | 192/85 AA X |
| 3,750,789 | 8/1973 | Buchelt | 192/113 B X |
| 3,823,802 | 7/1974 | Winzeler et al. | 192/113 B |
| 4,082,171 | 4/1978 | Lalin et al. | 192/70.2 |
| 4,225,026 | 9/1980 | Yamamori et al. | 192/85 AA X |
| 4,238,020 | 12/1980 | Nersted et al. | 192/85 A X |
| 4,267,910 | 3/1981 | Yamamori et al. | 192/70.12 X |
| 4,301,904 | 11/1981 | Ahlen | 192/70.12 |
| 4,327,947 | 5/1982 | Bower, Jr. | 411/517 X |
| 4,373,622 | 2/1983 | Michael | 192/85 AA |

FOREIGN PATENT DOCUMENTS

| | | |
|---|---|---|
| 2705196 | 8/1978 | Fed. Rep. of Germany . |
| 0274543 | 6/1970 | U.S.S.R. ............................ 411/518 |

*Primary Examiner*—Rodney H. Bonck
*Assistant Examiner*—David D. House
*Attorney, Agent, or Firm*—Schwartz, Jeffery, Schwaab, Mack, Blumenthal & Koch

[57] ABSTRACT

In a wet type multiple disc clutch for automatic transmission, a series of driving discs or plates and driven plates rotate on a clutch hub of a hollow cylinder. This clutch hub is made by press forming, and has at least one cut portion with which inward projections formed in the driving plates are engaged so that the driving plates rotate together with the clutch hub. The clutch hub is further provided with an inwardly projecting annular barrier member fit in the internal circumference of the clutch hub for directing lubricating oil through the cut portion to the friction surfaces of the driving plates and the driven plates by preventing the oil from spreading away. For example, this barrier member may take the form of a snap ring retained in an annular groove formed in the internal circumference of the clutch hub, or a cylindrical member with an inward flange inserted into the clutch hub.

3 Claims, 13 Drawing Figures

WET TYPE MULTIPLE DISC CLUTCH

BACKGROUND OF THE INVENTION

The present invention relates to a wet type multiple disc clutch mainly used in an automatic transmission of an automobile.

In a wet type multiple disc clutch, lubricating oil is supplied to friction surfaces of clutch discs or plates by being scattered by centrifugal force. It is important to design component members of a clutch, especially a clutch hub, so as to efficiently receive scattered oil and direct it to the friction surfaces. However, it is very difficult to produce a clutch hub of such a desirable design if it is made of steel plate by press forming.

SUMMARY OF THE INVENTION

It is therefore an object of the present invention to provide a wet type multiple disc clutch having such a design that lubricating oil is efficiently used for lubrication without uselessly spreading out while its clutch hub is made by press forming.

According to the present invention, a wet type multiple disc clutch comprises a clutch drum and a clutch hub which is a hollow cylinder made by press forming and has an inward end extending into the clutch drum and at least one cut portion. In the clutch drum, there is further disposed a series of first plates and second plates. The second plates are rotatably mounted on the clutch hub. The first plates are, on their external circumference, engaged with the clutch drum so that they rotate together. Each of the second plates has at least one inward projection which is engaged with the cut portion of the clutch hub so that the second plates and the clutch hub rotate together. In order to engage and disengage the first plates and the second plates thereby to connect and disconnect the transmission of rotation between the clutch drum and the clutch hub, there is further provided actuating means which comprises a pistion disposed in the clutch drum for compressing the first plates and the second plates together. The clutch hub of this clutch is further provided with an inwardly projecting annular barrier member fit in the inner circumference of the clutch hub near the inward end of the clutch hub, for gathering scattered lubricating oil and introducing it to the friction surfaces of the first plates and the second plates through the cut portion of the clutch hub.

DETAILED DESCRIPTION OF THE INVENTION

Figure 1:
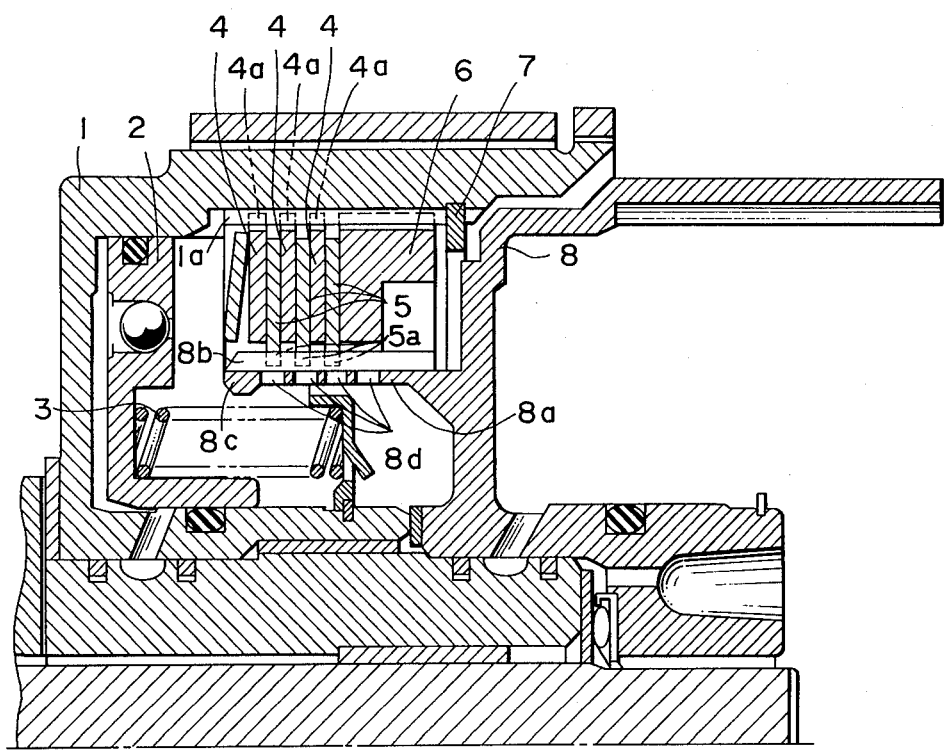
FIG. 1 is a sectional view of a conventional wet type multiple disc clutch.

To facilitate understanding the present invention, a brief reference will be made to a conventional example of a wet type multiple disc clutch design, depicted in FIG. 1. In a rotatable clutch drum 1, there are disposed a piston 2, return springs 3, driven plates 4, driving plates or discs 5, a retainer plate 6, and a snap ring 7, as shown in FIG. 1. External splines 4a formed in the driven plates 4 are engaged with splines 1a formed in the clutch drum 1, and these splines enable the driven plates 4 and the clutch drum 1 to rotate together. On the other hand, internal splines 5a formed in the driving plates 5 are engaged with splines 8b formed in a clutch hub 8a of a rotary member 8, so that the driving plates 5 and the rotary member 8 rotate together. With this arrangement, when oil pressure is exerted on the piston 2, the driving plates 5 and the driven plates 4 are clamped together by the aid of friction between their surfaces so that torque can be transmitted between the clutch drum 1 and the rotary member 8. When the oil pressure is released, the clutch drum 1 and the clutch hub 8a are disconnected from each other. Thus, the driven plates 4 and the driving plates 5 are engaged and disengaged while either or both of them are rotating. The gaps between the driving plates 5 and the driven plates 4 are very narrow even in the disengaged state, and there exists a great rotational speed difference therebetween. Therefore, the friction surfaces of the driving plates 5 and the driven plates 4 must be sufficiently lubricated with oil in order to dissipate a great amount of heat generated there and to prevent burnout and wear. In the clutch hub 8a of FIG. 1, there are formed a bank 8c and a plurality of through holes 8d which extend radially through the wall of the clutch hub 8a and open outwardly at the bottoms of the spaces between the splines 8b. With this arrangement, supplied lubricating oil is stopped by the bank 8c from axially spreading out, and scattered through the through holes 8d over the friction surfaces of the driving plates 5 and the driven plates 4 by the aid of centrifugal force.

Figure 2:
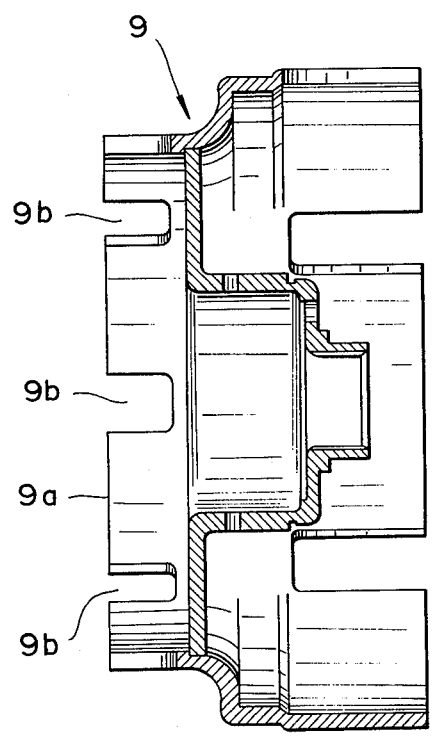
FIG. 2 is a sectional view of a conventional rear clutch drum.

To make a clutch hub of the design of FIG. 1 is not difficult if it is made by casting or casting plus machining. However, recently it is considered more advantageous to make clutch hubs of steel plate by press forming in view of improvement of production efficiency and reduction of automobile weight. FIG. 2 shows, as an example, a rotary member 9 having a clutch hub 9a made by press forming. In this case, the clutch hub 9a has a plurality of cut portions 9b, and on the other hand, each of the driving plates has, on its internal circumference, a plurality of inward projections which are designed to engage with one of the cut portions 9b of the clutch hub 9a. However, this clutch hub 9a has no barrier for obstructing oil passage, such as the bank 8c of FIG. 1, because it is very difficult to form a bank in a clutch hub made by press forming. Accordingly, lubricating oil can easily run away axially along the internal surface of the clutch hub without serving for lubrication. Thus, lack of lubrication, causing burnout and wear of driving plates and driven plates, significantly shortens the life of a wet type multiple disc clutch having a clutch hub made by press forming.

In view of the above description, a reference is now made to FIGS. 3 to 13 in which various embodiments of the present invention are shown.

Figure 3:
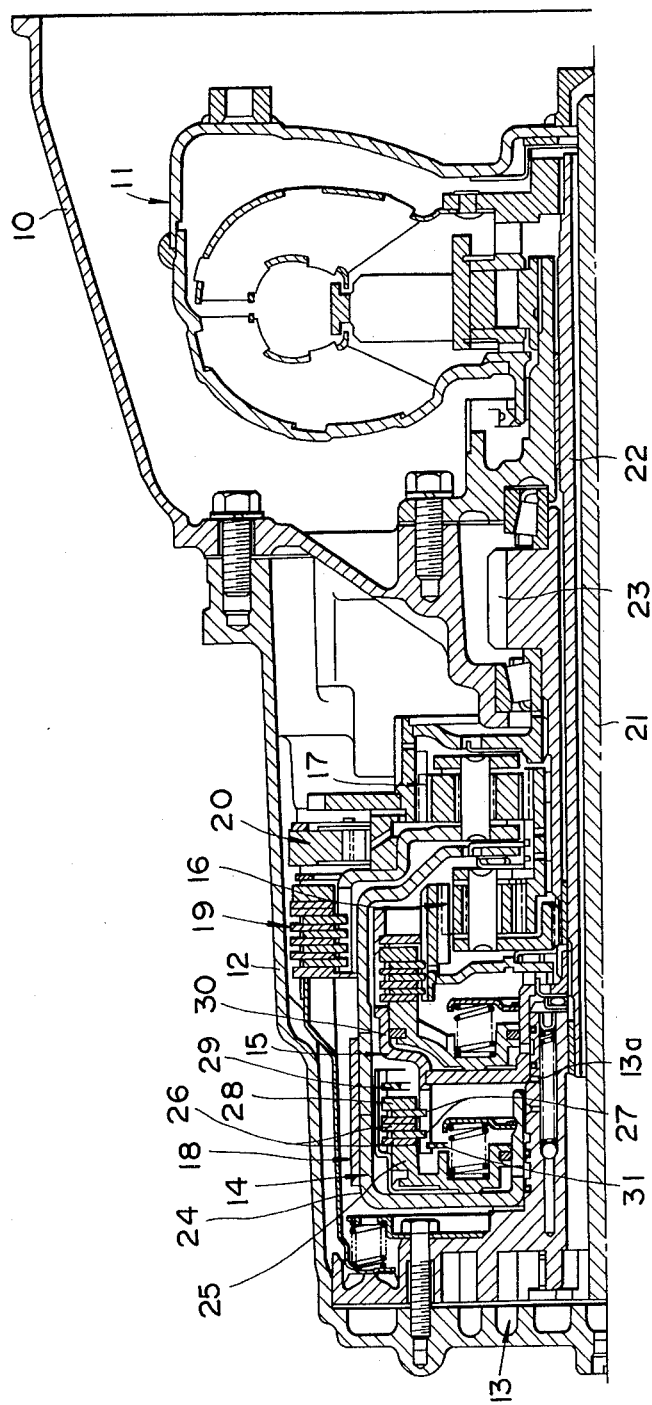
FIG. 3 is a sectional view of an automatic transmission having the multiple disc clutch according to the present invention.
Figure 4:
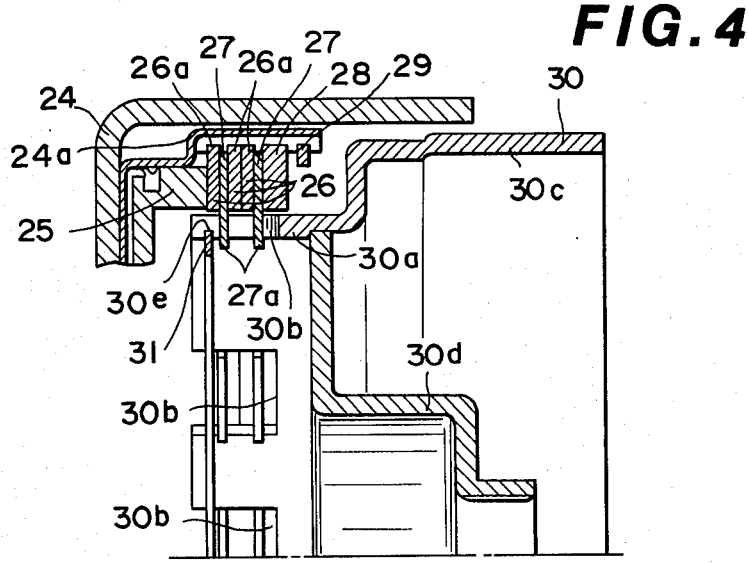
FIG. 4 is a sectional view of a multiple disc type clutch illustrating a first embodiment of the present invention.

A first embodiment is shown in FIGS. 3 and 4. FIG. 3 is the upper half of a sectional view of an automatic transmission for front wheel drive automobiles, in which the multiple disc clutch according to the present invention is incorporated as a front clutch. Of course, the present invention is also applicable to a rear clutch. In FIG. 3, a torque converter 11 is installed in a converter housing 10. In a transmission case 12 fixed to the converter housing 10, there are disposed an oil pump 13, a front clutch 14, a rear clutch 15, a first planetary gear set 16, a second planetary gear set 17, a band brake 18, a low and reverse brake 19, a one-way clutch 20, etc. A driving shaft 21 drives the oil pump 13, and an input shaft 22 connects the torque converter 11 and the rear clutch 15. An output gear 23 is connected with the gear train and transmits output power to a final gear. Thus, by driving and holding different gear train members, three forward gear ratios and one reverse gear ratio can be obtained on the output gear 23.

The front clutch 14 has a rotatable front clutch drum 24, in which there are disposed a piston 25, driven plates 26, driving plates 27, a retainer plate 28 and a snap ring 29, as shown in FIGS. 3 and 4. Each of the driven plates 26 has outward projections 26a on its external circumference, by which the driven plate 26 is engaged with an inner drum 24a fastened to the clutch drum 24, so that they rotate together. Each of the driving plates 27 has, on its internal circumference, inward projections 27a. On the other hand, a clutch hub 30a is integrally formed in a rear clutch drum 30 which corresponds to the rotary member 8 of FIG. 1, and the clutch hub 30a has a plurality of cut portions 30b. Thus, the inward projections 27a of the driving plates 27 are engaged with the cut portions 30b of the clutch hub 30a, respectively, so that they rotate together. The rear clutch drum 30 is produced by welding two members, an outer member 30c and an inner member 30d, which are made of steel plate by press forming. An annular groove 30e is formed on the internal circumference of the clutch hub 30a at the rear end region, and a snap ring 31 is snugly received in the groove 30e.

In this multiple disc clutch, lubricating oil works in the following manner. Driven by the oil pump 13, lubricating oil is discharged through outlets 13a and, propelled by centrifugal force, collides against and spreads over the inside surface of the clutch hub 30a. However, the oil flow over the inside surface of the clutch hub is confined by the snap ring 31 at the rear end and by the inner member 30d at the forward end. Consequently, the oil finds a vent in the cut portions 30b and gushes out through the cut portions, and spreads over the friction surfaces of the driven plates 26 and the driving plates 27. In the design of FIG. 4, the inward projections 27a of the driving plates 27 project inwardly beyond the inside surface of the clutch hub 30a. This design of the driving plates 27 is not always necessary, but advantageous to lubrication because oil is caught by the inward projections 27a and flows along them.

Figure 5:
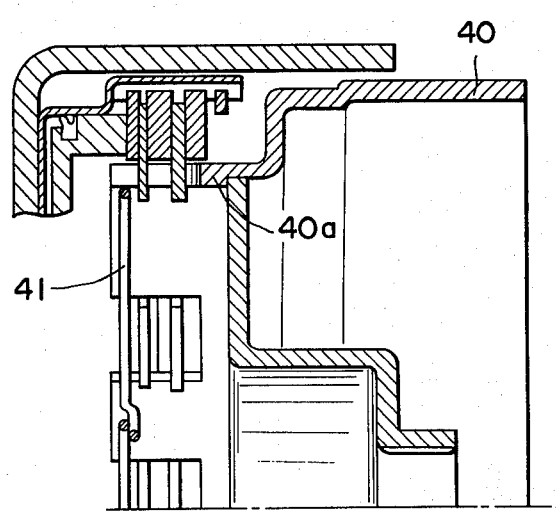
FIG. 5 is a sectional view of a multiple disc clutch illustrating a second embodiment of the present invention.
Figure 6:
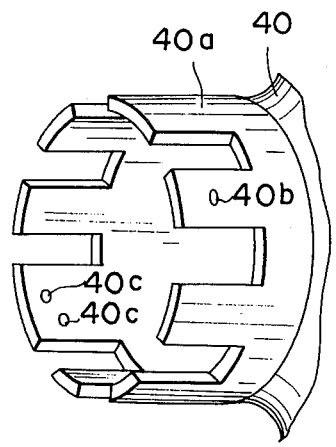
FIG. 6 is a perpective view of a clutch hub used in the multiple disc clutch of FIG. 5.
Figure 7:
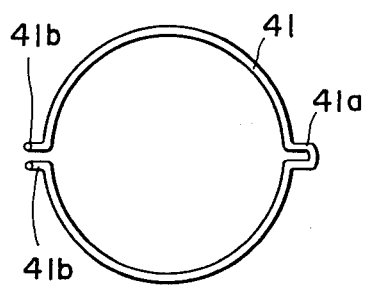
FIG. 7 is a front elevation of a wire ring used in the multiple disc clutch of FIG. 5.

A second embodiment of the present invention is shown in FIGS. 5 to 7, in which a wire ring is employed instead of the snap ring 31 of the first embodiment. As shown in FIG. 6, a clutch hub 40a of a rear clutch drum 40 produced by press forming is formed with an oblong hole 40b at the rear end region and a pair of holes 40c near the opposite position with respect to the axis of the clutch hub. On the other hand, a wire ring 41 is formed into a shape having a U-shaped outward projection 41a and both edges 41b bent outwardly, as shown in FIG. 7. This wire ring 41 is retained in the inner circumference of the clutch hub 40a by fitting the U-shaped projection into the oblong hole 40b and both the edges 41b into the holes 40c, respectively, as shown in FIG. 5. The thus arranged wire ring 41 serves as a barrier against oil in the same manner as the snap ring 31 of the first embodiment.

Figure 8:
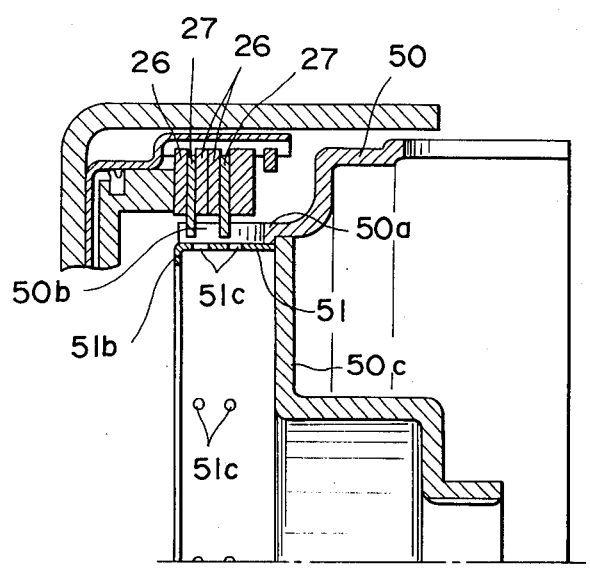
FIG. 8 is a sectional view of a multiple disc clutch illustrating a third embodiment of the present invention.
Figure 9:
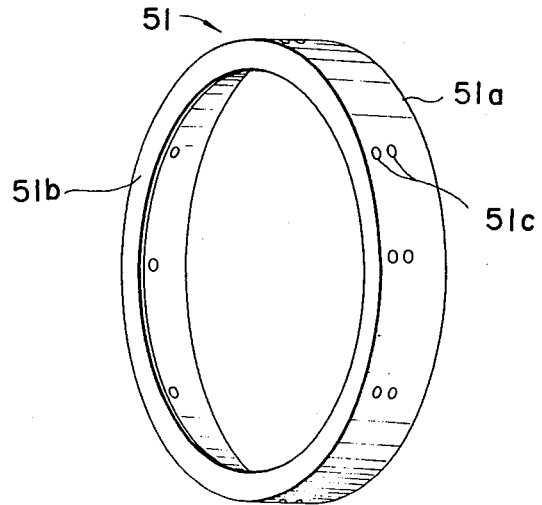
FIG. 9 is a perspective view of a cylindrical member used in the multiple disc clutch of FIG. 8.

A third embodiment of the present invention is shown in FIGS. 8 and 9. In this embodiment, a cylindrical member 51 shown in FIG. 9 is employed to form a barrier against oil flow. The cylindrical member 51 is composed of a cylinder portion 51a to be fit into the bore of the clutch hub and an inward flange 51b at one end. For allowing passage of oil, a plurality of holes 51c are formed in the cylinder portion 51a in such a position that these holes open into the cut portions of the clutch hub. This cylindrical member 51 is fit into the clutch hub 50a at a suitable rotation angle and fastened by spot welding.

In this embodiment, splashed oil is very efficiently received by cylinder portion 51a of the cylindrical member 51 and confined between the inward flange 51b of the cylindrical member 51 and the inner member 50c of the rear clutch drum 50, so that the oil is efficiently supplied by centrifugal force through the holes 51c to the friction surfaces of the driving plates 27 and the driven plates 26.

Figure 10:
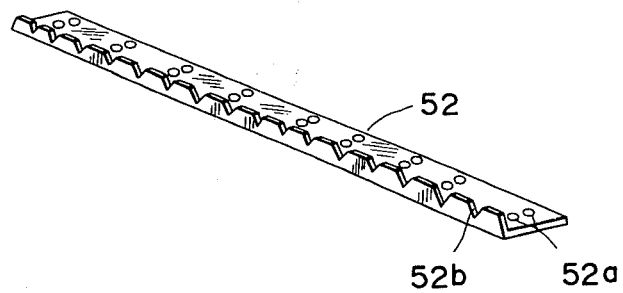
FIG. 10 is a perspective view of a band plate for making a cylindrical member.
Figure 11:
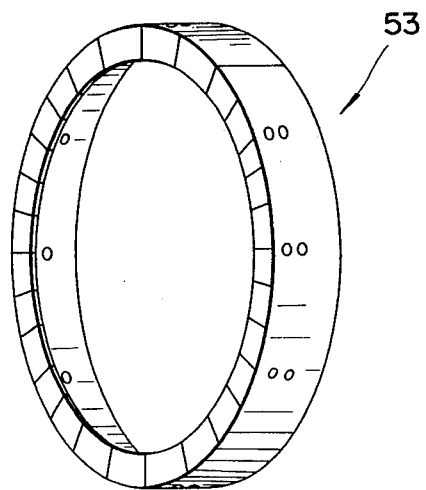
FIG. 11 is a perpective view of a cylindrical member formed from the band plate of FIG. 10.

Although FIG. 9 shows the cylindrical member as being made by press forming, it is optional to form a cylindrical member from a band plate as shown in FIGS. 10 and 11. The band plate 52 of FIG. 10 has a plurality of samll holes 52a at suitable positions, and one side which is bent perpendicularly and has a plurality of notches 52b. Thus, the cylindrical member 53 is made by bending the band plate 52 into a cylindrical shape, as shown in FIG. 11.

Figure 12:
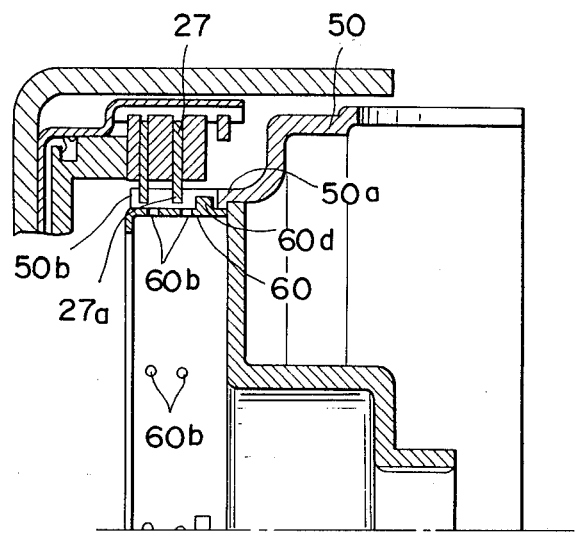
FIG. 12 is a sectional view of a multiple disc clutch illustrating a fourth embodiment of the present invention.
Figure 13:
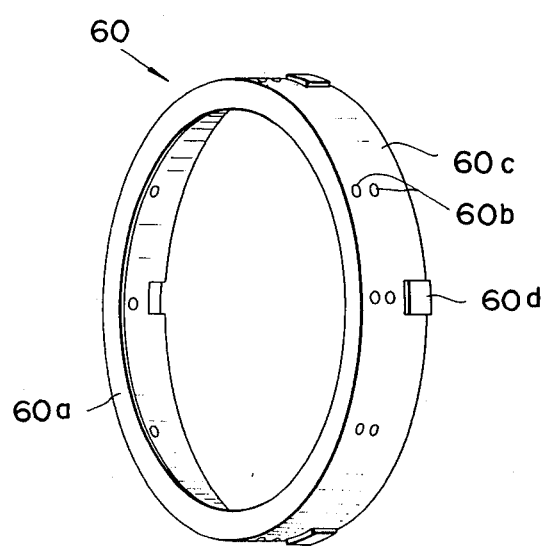
FIG. 13 is a perspective view of a cylindrical member used in the multiple disc clutch of FIG. 12.

A fourth embodiment of the present invention is shown in FIGS. 12 and 13, in which a cylindrical member similar to the cylindrical member of the third embodiment is fastened to the clutch hub without using spot welding. A cylindrical member 60 of this embodiment has an inward flange 60a and a cylinder portion 60c with a plurality of small holes 60b, like the cylindrical member of the third embodiment. However, the cylindrical member 60 of this embodiment further has bosses 60d each of which is arranged to engage with one of the cut portions 50b of the clutch hub 50a. This cylindrical member 60 is inserted into the bore of the clutch hub by fitting the bosses 60d in the cut portions 50b of the clutch hub 50a, respectively. The engagement of the bosses 60d and the cut portions 50b prevents relative rotation between the clutch hub 50a and the cylindrical member 60. The bosses 60d of the cylindrical member 60 also serve to prevent axial movement and extraction of the cylindrical member 60 because the bosses are stopped by the inward projections 27a of the driving plates 27. Although this cylindrical member 60 is different in mounting setup from the cylindrical member of the third embodiment, their functions are the same.

As explained above, the wet type multiple disc clutches according to the present invention are so arranged to prevent lubricating oil from spreading away without effect, and to gather and introduce it to the frictional surfaces of driving plates and driven plates. Therefore, the present invention can provide efficient lubrication for preventing burnout and wear of driving plates and driven plates, and by so doing, lengthen the life of a clutch.

What is claimed is:

1. A wet type multiple disc clutch comprising:
   a clutch drum,
   a clutch hub which is a press-formed hollow cylinder and has an inward end extending into said clutch drum and a plurality of cut portions passing through the cylindrical wall of said clutch hub,
   a series of first plates and second plates which are disposed around said clutch hub in said clutch drum, said first plates being, on their external circumference, engaged with said clutch drum to rotate together with said clutch drum, and each of said second plates having at least one inward projection engaged with a cut portion of said clutch hub so that said second plates and said clutch hub rotate together, and
   actuating means comprising a piston disposed in said clutch drum for engaging and disengaging said first plates and said second plates thereby to connect and disconnect the transmission of rotations between said clutch drum and said clutch hub,
   said clutch hub being provided with a cylindrical oil catching member which is fit in said clutch hub and has an inward flange positioned near the inward end of the clutch hub and a plurality of through holes opening into said cut portions.

2. The clutch according to claim 1, wherein said cylindrical member is fastened to said clutch hub by welding.

3. The clutch according to claim 1, wherein said cylindrical member is formed, on the external circumference, with at least one boss which is engaged with said cut portion of said clutch hub for preventing relative rotation therebetween and has such a height that said boss collides with said inward projections of said second plates when said cylindrical member is axially moved.

* * * * *